Dec. 11, 1923.
S. W. CADY
1,477,526
LEVERLESS DISK HARROW
Filed Nov. 22, 1918    3 Sheets-Sheet 2
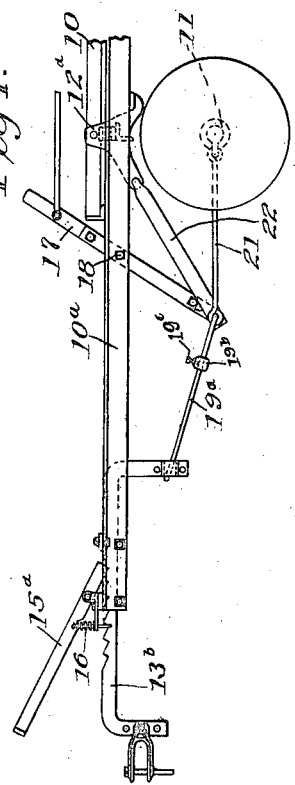
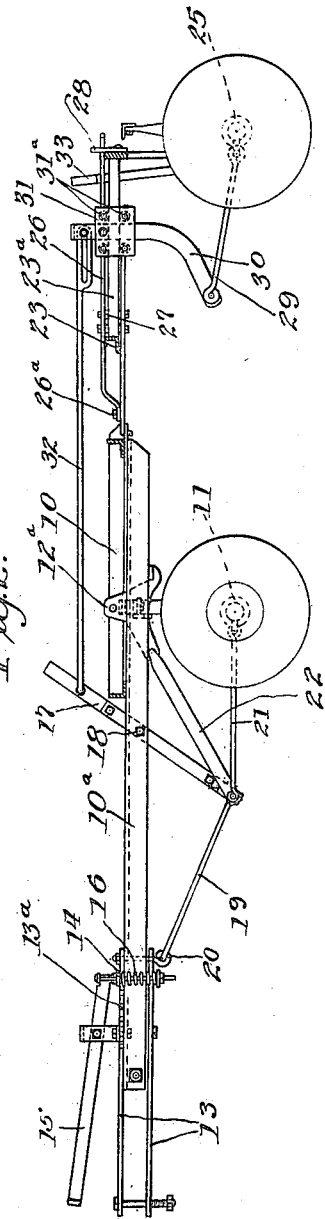
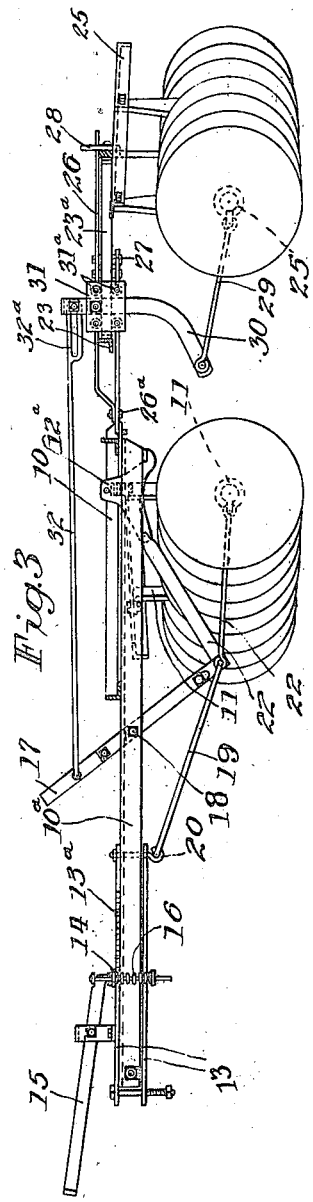
Inventor
Sherman W. Cady
by Chas. E. Lord
Atty

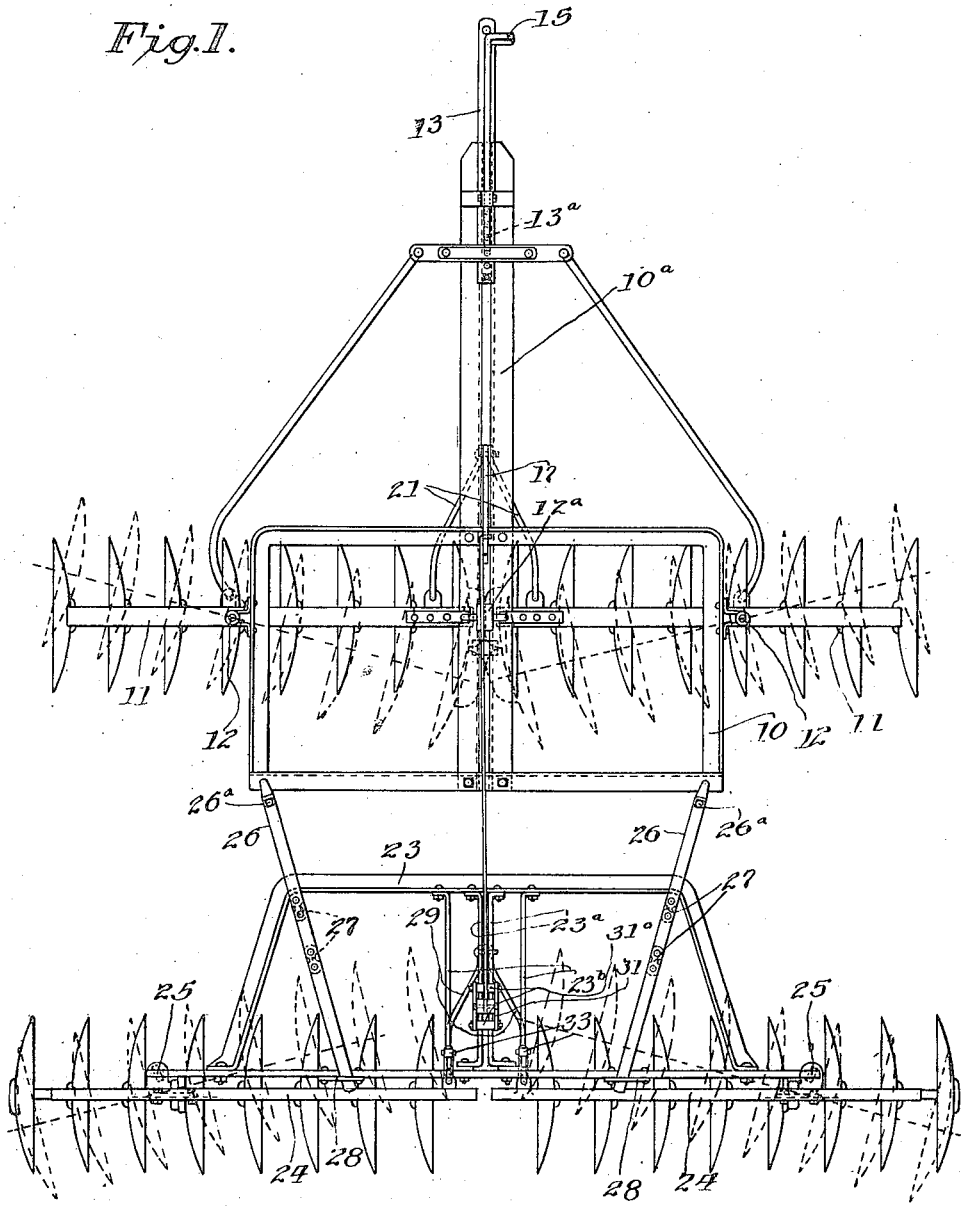

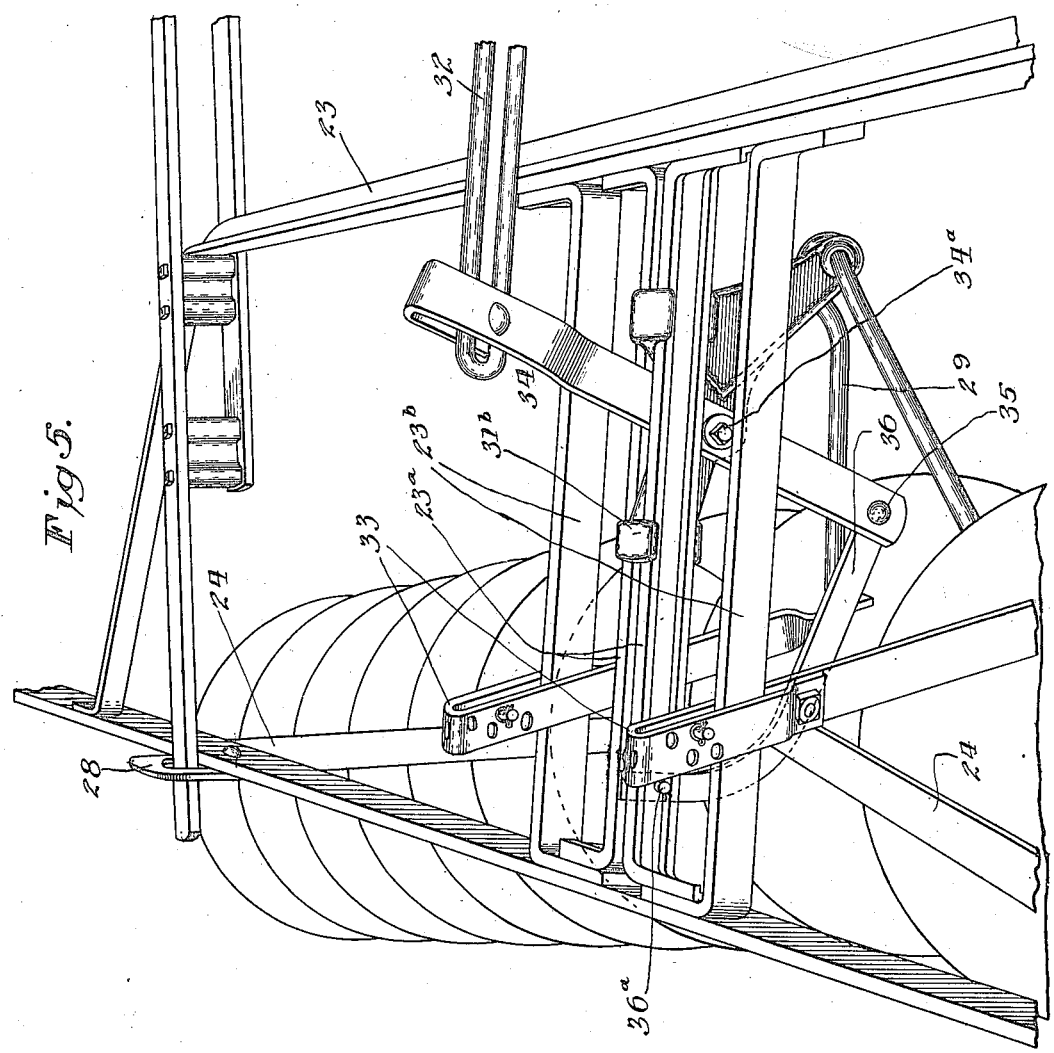

Patented Dec. 11, 1923.

1,477,526

UNITED STATES PATENT OFFICE.

SHERMAN W. CADY, OF AUBURN, NEW YORK, ASSIGNOR TO INTERNATIONAL HARVESTER COMPANY, A CORPORATION OF NEW JERSEY.

LEVERLESS DISK HARROW.

Application filed November 22, 1918. Serial No. 263,674.

*To all whom it may concern:*

Be it known that I, SHERMAN W. CADY, a citizen of the United States, residing at Auburn, in the county of Cayuga and State of New York, have invented certain new and useful Improvements in Leverless Disk Harrows, of which the following is a full, clear, and exact specification.

This invention relates to disk harrows and especially to double disk harrows.

Heretofore it has been customary to make double disk harrows with the gangs of the front and rear sections angled by hand. In some types the gangs of each section are operated by separate hand levers and in others by a single lever operable from the seat of the tractor which pulled the harrow.

It is an object of this invention to dispense with the levers entirely for angling or straightening the gangs and to derive power for these operations from the tractor.

Another object is to provide a harrow with means for angling the harrow by power and means for locking in the angled or straightened positions.

Another object is to provide means for angling or straightening both forward and rear gangs substantially the same amount and at the same time.

Another object is to provide means for straightening the rear gangs on turning a corner with the harrow, thereby greatly relieving the strains in the harrow.

With these and other objects in view, my invention consists of a harrow having front and rear sections, disk gangs on both sections and means for angling both sets of gangs by a push on the draft member.

Referring now to the drawings:—

Figure 1 is a plan view of a harrow embodying my invention;

Fig. 2 is a partial section at the left of the center of Fig. 1 showing the gangs straightened;

Fig. 3 is the same with the gangs angled;

Fig. 4 is the same as the forward end of Fig. 2 but with a modified form of draft member; and Fig. 5 is a modified form of the angling mechanism of the rear gang.

This harrow embodying my invention consists of two sections, a front section and a rear section, the front section having a frame 10 on which are preferably hingedly mounted two disk gangs 11 at the vertical pivots 12 at a point which is a little more than half the length of the disk gangs from their inner ends. The inner ends of the gangs are slidably supported on the tongue angles 10ª by means of a guide block 12ª.

Sliding draft members 13 are slidably mounted on the tongue angles 10ª and arranged to slide under a plate 14. A foot lever 15 has a finger passing through the plate 14 and engaging notches 13ª in the sliding draft member 13. A spring 16 holds the foot lever down in engagement with the draft members 13.

A lever 17 is pivoted at 18 to the tongue angles 10ª, and a rod 19 connects the lower end of this lever to an eye 20 on the draft members 13. Rods 21 and 22 connect the lower end of the lever 17 also with the inner bearings of the disk shaft and the guide block 12ª respectively.

It will be seen therefore that when the draft members are pushed back along the tongue angles the rods 21 and 22 will be forced back, angling the gangs, and that as these draft members are drawn forward the gangs are straightened. In order to effect movement of the draft members in either direction in Figs. 2 and 3 the foot lever must be released at the same time the tractor pushes or pulls on the draft members 13.

The rear section consists of a frame 23 having disk gangs 24 hingedly mounted thereon at 25. Connection is made between the rear section and the front section by means of two rearwardly converging telescoping draft members 26 which are hingedly connected at their forward ends to the front section and which have two bars surrounding the forward extension of the frame 23 of the rear section. These bars are bolted at their forward ends at 26ª and are connected at the rear of the lower bar by blocks 27 which normally lie in the forward corners of the rear frame 23. The upper bar extends over the rear of the frame and through the loops 28. This permits the sections to approach each other in backing and the inner ends to converge on turning a corner.

The inner ends of the rear disk gangs 24 are regulated by links 29 which are hingedly attached to the bar 30 which is carried by a block 31 which slides on the rear frame members 23ª. Rollers 31ª are supplied to decrease the friction of the block. This block is connected to the lever 17 by the angling rod 32. A loop 32ª at the rear of this rod permits it to telescope somewhat when the two harrow sections are brought nearer together as in backing or turning. In backing the two frames approach each other due to the telescoping action of the members 26. The sliding block 31 thus strikes the forward end of the slot 32ª and the rod 32 assists the rear harrow gangs to straighten. The action of the ground on the rear harrow gangs causes the inner ends to raise and the outer ends to dig into the ground, thereby swinging the rear gangs into the straightened position. The slot 32ª in the rod 32 also permits the rear gangs to automatically straighten to a certain extent in turning a corner, which greatly relieves the pull on the outer draft member 26. Nearly all the pull comes on the outer draft member in turning.

The level of the inner ends of the rear gangs is maintained by rods 33 which are guided on the frame members 23ᵇ. This feature is well shown in Fig. 5 as is also a modified form of sliding block 31ᵇ having a lever 34 attached thereto at 34ª. This lever is pivoted at 35 to a link 36 which is pivotally connected to the rear frame at 36ª. The advantage of this arrangement is that the point 34ª can be so located on the block 31ᵇ that there is practically no binding action on the guide members and it also decreases the tendency of the frame to slide ahead on the converging draft bars 26 when the gangs assume their working positions.

Fig. 4 shows a modified form of draft member 13ᵇ having ratchet teeth, which is engaged by a foot operated dog 15ª held in operative positions by a spring 16ª. The rear end of the draft member 13ᵇ is bent down and has an opening to slidably receive the link 19ª. This link is bent at its front end for engagement with the depending arm of draft member 13ᵇ and has a set collar 19ᵇ adjustably secured thereon by means of a set screw 19ᶜ. The set collar should be adjusted back far enough on link 19ª as to allow the front gangs to straighten if the harrow is backed when the gangs are in angled position, as in Fig. 3. Under such conditions, the slidable connection allows the link 19ª to telescope through the rear end of the draft member 13ᵇ, thus allowing the front gangs as well as the rear to be straightened by resistance of the soil on the disks and the angled position of the gangs will be reassumed when the harrow is again advanced. Both sets of gangs are straightened in both forms shown by releasing the foot lever 15 or 15ª as the harrow is pulled forward, but with the construction of Fig. 4 the angle for both sets of gangs is set by backing the draft head from the position shown in that figure and the gangs will then fall into the angle set when the harrow moves forwardly.

From the foregoing it will be seen that I have invented a leverless disk harrow in which all the operations of angling and straightening the disk gangs can be performed by the push and pull of the tractor on the draft members and without the operator leaving the tractor seat.

While I have in the above specification shown and described but a single embodiment of my invention, it is to be understood that it is capable of many modifications. Changes therefore in the construction and arrangement of parts may be made which do not depart from the spirit and scope of my invention as disclosed in the appended claims.

I claim:

1. In a harrow, front and rear sections, disk gangs on both sections, a draft member movable relatively to said sections, and means for angling the gangs by rearward movement of the draft member.

2. In a harrow, front and rear sections, disk gangs on both sections, a draft member movable relatively to said sections, and a connection between the draft member and disk gangs whereby a rearward movement of the draft member will angle the disk gangs.

3. In a double harrow, front and rear sections, draft members slidable on the front section, disk gangs hingedly mounted on both sections, rigid link connections between the draft members and the gangs of the front sections, including a lever hingedly mounted on said front section, and a link between said lever and the ends of the gangs of the rear section.

4. In a harrow, front and rear sections, disk gangs carried by each section, draft actuated means for positively angling the gangs of the front section, and means including a lever on the rear section and a rod connected to said first means for angling the gangs of the rear section.

5. In a harrow, front and rear sections, disk gangs carried by each section, draft actuated means for positively angling the gangs of the front section, and means including a sliding block on the rear section and a lever pivotally attached to said block and a rod connected to said first means for angling the gangs of the rear section.

6. In a harrow, a frame, disk gangs carried thereby, means for forcing said gangs into angle by backing, and means operable from a point outside the harrow for straightening the angle of the gangs as the harrow is drawn forward.

7. In a harrow, a frame, disk gangs carried thereby, a member slidable on the frame and adapted to receive the draft power, said member including a coupling element below said frame, a lever extending below the frame, a connection between said lever and the gangs, a rod connecting said coupling element with the lower end of said lever, means for locking said member with respect to said frame, and means for controlling said locking means from a point outside the harrow.

In testimony whereof I affix my signature.

SHERMAN W. CADY.